(12) United States Patent
Kurz (10) Patent No.: US 11,282,171 B1
(45) Date of Patent: Mar. 22, 2022

(54) GENERATING A COMPUTER GRAPHIC FOR A VIDEO FRAME

(71) Applicant: Apple Inc., Cupertino, CA (US)

(72) Inventor: Daniel Kurz, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 101 days.

(21) Appl. No.: 16/583,103

(22) Filed: Sep. 25, 2019

Related U.S. Application Data (60) Provisional application No. 62/776,240, filed on Dec. 6, 2018, provisional application No. 62/737,743, filed on Sep. 27, 2018.

(51) Int. Cl.
*G06T 3/40* (2006.01)
*G06T 7/40* (2017.01)
*G06T 15/00* (2011.01)
*G06T 19/00* (2011.01)
*G06T 15/50* (2011.01)
*G06T 11/60* (2006.01)
*G06T 7/00* (2017.01)

(52) U.S. Cl.
CPC .......... *G06T 3/4084* (2013.01); *G06T 7/0016* (2013.01); *G06T 7/40* (2013.01); *G06T 11/60* (2013.01); *G06T 15/005* (2013.01); *G06T 15/50* (2013.01); *G06T 19/006* (2013.01); *G06T 2207/20224* (2013.01)

(58) Field of Classification Search
None
See application file for complete search history.

(56) References Cited

U.S. PATENT DOCUMENTS

2016/0171754 A1* 6/2016 Ahn .................. G06T 15/50
345/426

OTHER PUBLICATIONS

Xing, Guanyu, et al. "Apractical approach for real-time illumination estimation of outdoor videos." Computers & Graphics 36.7 (2012): 857-865.*
Liu, Yanli, et al. "Light source estimation of outdoor scenes for mixed reality." The Visual Computer 25.5 (2009): 637-646.*
OpenGL "Basic Lighting", archived Aug. 27, 2018, retrieved from https://web.archive.org/web/20180827132855/https://learnopengl.com/Lighting/Basic-Lighting Mar. 12, 2021.*
Martin Vilcans, "Virtual Reality Tricks: Asynchronous Timewarp and Late Latching", Librador, Mar. 10, 2015, pp. 1-3.

* cited by examiner

*Primary Examiner* — Frank S Chen
(74) *Attorney, Agent, or Firm* — Fernando & Partners, LLP (57) ABSTRACT

In some implementations, a method includes obtaining a computer graphic generated based on one or more visual elements within a first video frame. In some implementations, the first video frame is associated with a first time. In some implementations, the method includes obtaining a second video frame associated with a second time. In some implementations, the second time is different from the first time. In some implementations, the method includes applying an intensity transformation to the computer graphic in order to generate a transformed computer graphic. In some implementations, the intensity transformation is based on an intensity difference between the first video frame and the second video frame. In some implementations, the method includes rendering the transformed computer graphic based on one or more visual elements within the second video frame.

24 Claims, 8 Drawing Sheets

GENERATING A COMPUTER GRAPHIC FOR A VIDEO FRAME

CROSS REFERENCE TO RELATED APPLICATIONS

This application claims priority to U.S. patent application No. 62/737,743, filed on Sep. 27, 2018, and to U.S. patent application No. 62/776,240, filed on Dec. 6, 2018, which are hereby incorporated by reference in their entirety.

TECHNICAL FIELD

The present disclosure generally relates to computer-generated reality (CGR) environments, and in particular to computer graphics for a CGR environment.

BACKGROUND

Virtual reality (VR) and augmented reality (AR) are becoming more popular due to their remarkable ability to alter a user's perception of the world. For example, VR and AR are used for learning purposes, gaming purposes, content creation purposes, social media and interaction purposes, or the like. These technologies differ in the user's perception of his/her presence. VR transposes the user into a virtual space so their VR perception is different from his/her real-world perception. In contrast, AR takes the user's real-world perception and adds something to it.

These technologies are becoming more commonplace due to, for example, miniaturization of hardware components, improvements to hardware performance, and improvements to software efficiency. As one example, a user may experience VR content by using a head-mountable device (HMD) that encloses the user's field-of-view and is tethered to a computer. As another example, a user may experience AR content by wearing an HMD that still allows the user to see his/her surroundings (e.g., glasses with optical see-through). As yet another example, a user may experience AR content superimposed on a live video feed of the user's environment on a handheld display (e.g., an AR-enabled mobile phone or tablet).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for rendering computer graphics in a computer-generated reality (CGR) experience. In some implementations, a method is performed by a device including a non-transitory memory and one or more processors coupled with the non-transitory memory. In some implementations, the method includes obtaining a computer graphic generated based on one or more visual elements within a first video frame. In some implementations, the first video frame is associated with a first time. In some implementations, the method includes obtaining a second video frame associated with a second time. In some implementations, the second time is different from the first time. In some implementations, the method includes applying an intensity transformation to the computer graphic in order to generate a transformed computer graphic. In some implementations, the intensity transformation is based on an intensity difference between the first video frame and the second video frame. In some implementations, the method includes rendering the transformed computer graphic based on one or more visual elements within the second video frame.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1:
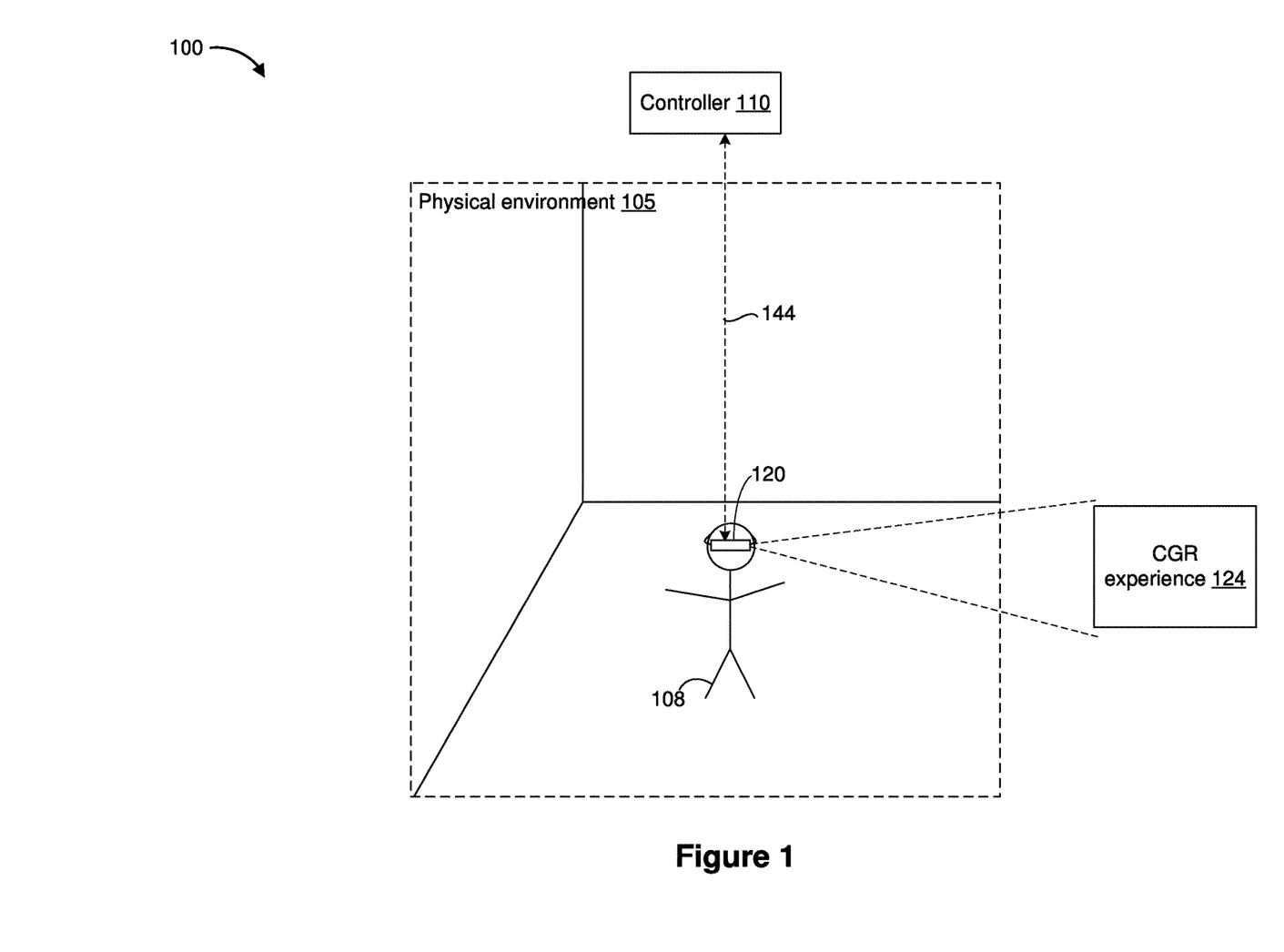
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mountable device (HMD) 120.

In some implementations, the controller 110 and/or the HMD 120 are configured to manage and coordinate a CGR experience 124 for a user 108 located in a physical environment 105. In some implementations, the controller 110 includes a suitable combination of software, firmware, and/or hardware. In some implementations, the controller 110 is a computing device that is local or remote relative to the physical environment 105. For example, the controller 110 may be a local server located within the physical environment 105. In another example, the controller 110 is a remote server located outside of the physical environment 105 (e.g., a cloud server, central server, etc.).

In some implementations, the controller 110 is communicatively coupled with the HMD 120 via a wired or wireless communication channel 144 (e.g., BLUETOOTH, IEEE 802.11x, IEEE 802.16x, IEEE 802.3x, etc.). In some implementations, the operating environment 100 includes additional sensors (e.g., cameras) that are dispersed throughout the physical environment 105. In such implementations, the controller 110 and/or the HMD 120 are communicatively coupled with the sensors that are dispersed throughout the physical environment 105 via wired or wireless communication channels (e.g., BLUETOOTH, IEEE 802.11x, IEEE 802.16x, IEEE 802.3x, etc.).

In some implementations, the HMD 120 is configured to present the CGR experience 124 to the user 108. In some implementations, the HMD 120 includes a suitable combination of software, firmware, and/or hardware. For example, in some implementations, the HMD 120 includes one or more CGR displays. In some implementations, the HMD 120 presents the CGR experience 124 by displaying data corresponding to the CGR experience 124 on the one or more CGR displays. In some implementations, the functionalities of the controller 110 are provided by and/or combined with the HMD 120.

According to some implementations, the HMD 120 presents the CGR experience 124 to the user 108 while the user 108 is virtually and/or physically present within the physical environment 105. In some implementations, while presenting an augmented reality (AR) experience, the HMD 120 is configured to present AR content and to enable optical see-through of the physical environment 105. In some implementations, while presenting a virtual reality (VR) or mixed reality (MR) experience, the HMD 120 is configured to present VR or MR content and to enable video pass-through of the physical environment 105.

In some implementations, the user 108 wears the HMD 120 on his/her head. As such, the HMD 120 includes one or more CGR displays provided to display the CGR content. For example, the HMD 120 encloses the field-of-view of the user 108. In some implementations, the HMD 120 is replaced with a CGR chamber, enclosure, or room configured to present CGR content in which the user 108 does not wear the HMD 120.

In some implementations, the HMD 120 includes a front-facing camera (not shown) that captures a video of the physical environment 105. In some implementations, the HMD 120 transmits video frames captured by the front-facing camera to the controller 110. In some implementations, a camera is located in the physical environment 105 (e.g., attached to one of the walls or the ceiling). In such implementations, the HMD 120 and/or the controller 110 obtain video frames from the camera located in the physical environment 105.

Figure 2A:
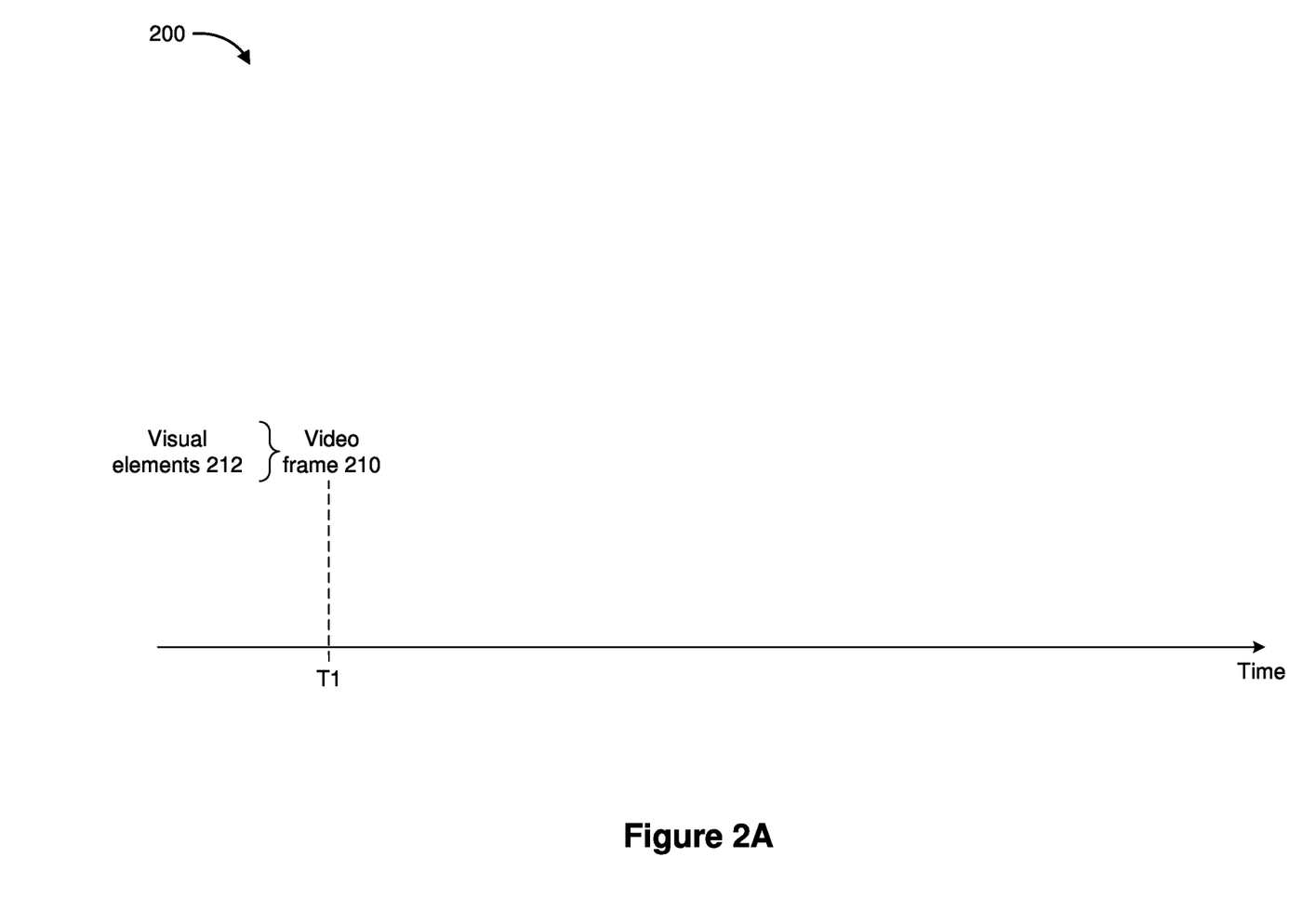
FIGS. 2A-2E are diagrams of an example computer graphic transformation in accordance with some implementations.

FIGS. 2A-2E illustrate an example computer graphic transformation 200 in accordance with some implementations. FIG. 2A illustrates a first video frame 210 that is associated with a first time T1. In some implementations, the controller 110 and/or the HMD 120 obtain the first video frame 210 at the first time T1. In some implementations, a camera (e.g., a front-facing camera of the HMD 120) captures the first video frame 210 at the first time T1.

The first video frame 210 includes a first set of visual elements 212. In some implementations, the first set of visual elements 212 include visual representations of objects that are located in the physical environment 105. In some implementations, the first set of visual elements 212 indicates a first intensity level associated with the first video frame 210. In some implementations, an intensity level of a video frame refers to a brightness level associated with the video frame (e.g., an ambient light level). In some implementations, an intensity level of a video frame refers to a color temperature level associated with the video frame. For example, in some implementations, the first set of visual elements 212 indicate a first ambient lighting level of the physical environment 105 when the first video frame 210 was captured. In some implementations, the first set of visual elements 212 includes pixel values for various pixels in the first video frame 210.

Figure 2B:
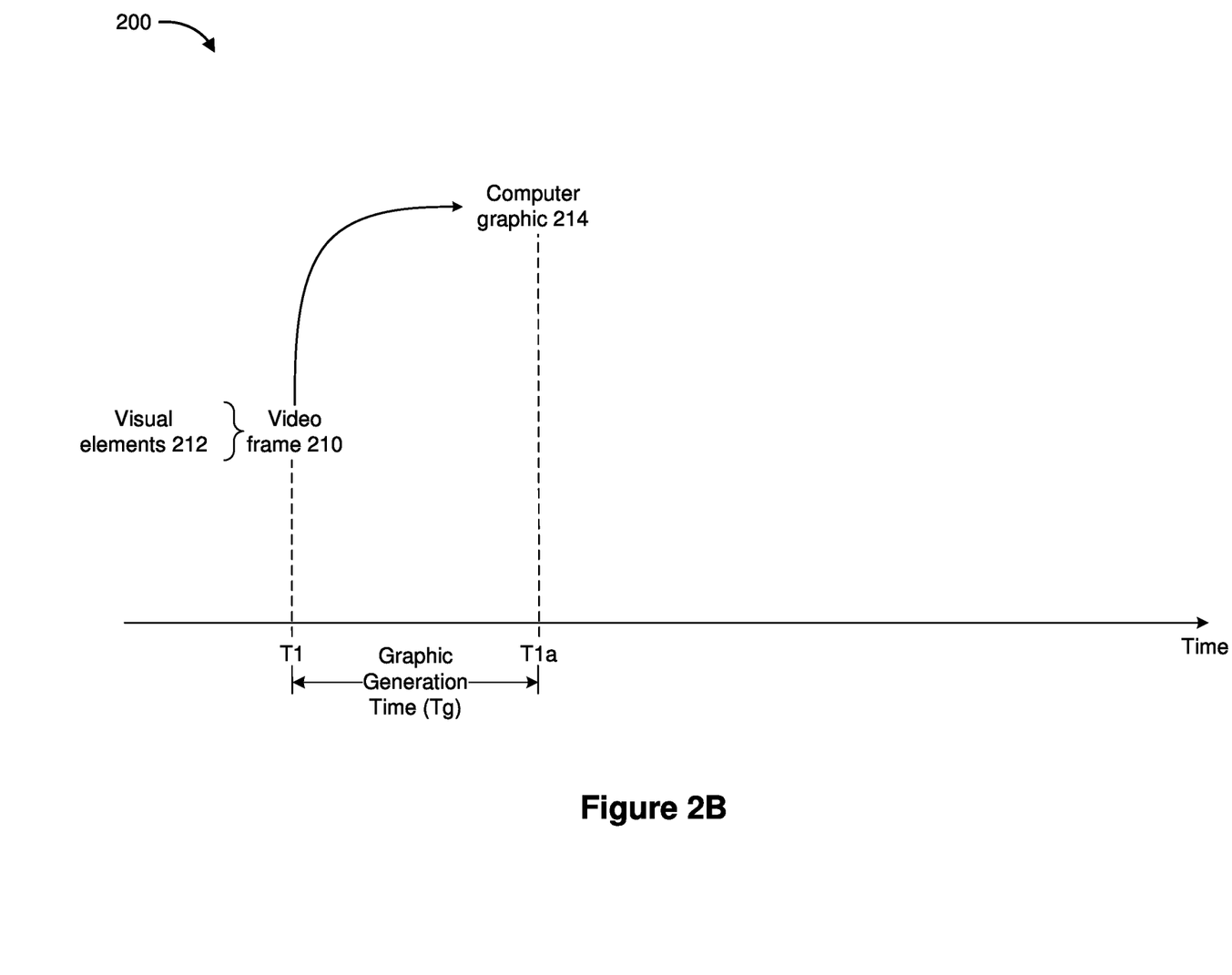

Referring to FIG. 2B, the controller 110 and/or the HMD 120 generate a computer graphic 214 for the first video frame 210 based on the first set of visual elements 212. In some implementations, generating the computer graphic 214 includes generating vector graphics. In some implementations, generating the computer graphic 214 includes generating a graphic vector. In some implementations, generating the computer graphic 214 includes computing pixels values. In some implementations, the computer graphic 214 indicates pixels colors. In some implementations, the computer graphic 214 is a function of the first set of visual elements 212. For example, the computer graphic 214 is a function of an ambient lighting level of the physical environment 105 when the first video frame 210 was captured. In some implementations, generating the computer graphic 214 includes selecting a virtual lighting level based on the ambient lighting level of the physical environment 105 when the first video frame 210 was captured.

In some implementations, the computer graphic 214 includes content that is augmented to the first video frame 210 (e.g., when the CGR experience 124 includes an AR experience). In some implementations, the computer graphic 214 includes content that is augmented to a subsequent video frame (e.g., the second video frame 220 shown in FIG. 2C). For example, in some implementations, the computer graphic 214 includes indicators (e.g., arrows, pictures and/or videos) that are overlaid onto a video frame (e.g., the first video frame 210 and/or the second video frame 220). In some implementations, the computer graphic 214 includes text labels that are overlaid on top of a video frame (e.g., the first video frame 210 and/or the second video frame 220).

In the example of FIG. 2B, the controller 110 and/or the HMD 120 finish generating the computer graphic 214 at time T1a. Graphic generation time Tg indicates an amount of time it takes the controller 110 and/or the HMD 120 to generate the computer graphic 214. In some implementations, the controller 110 and/or the HMD 120 render the first video frame 210 and the computer graphic 214 at time T1a.

Figure 2C:
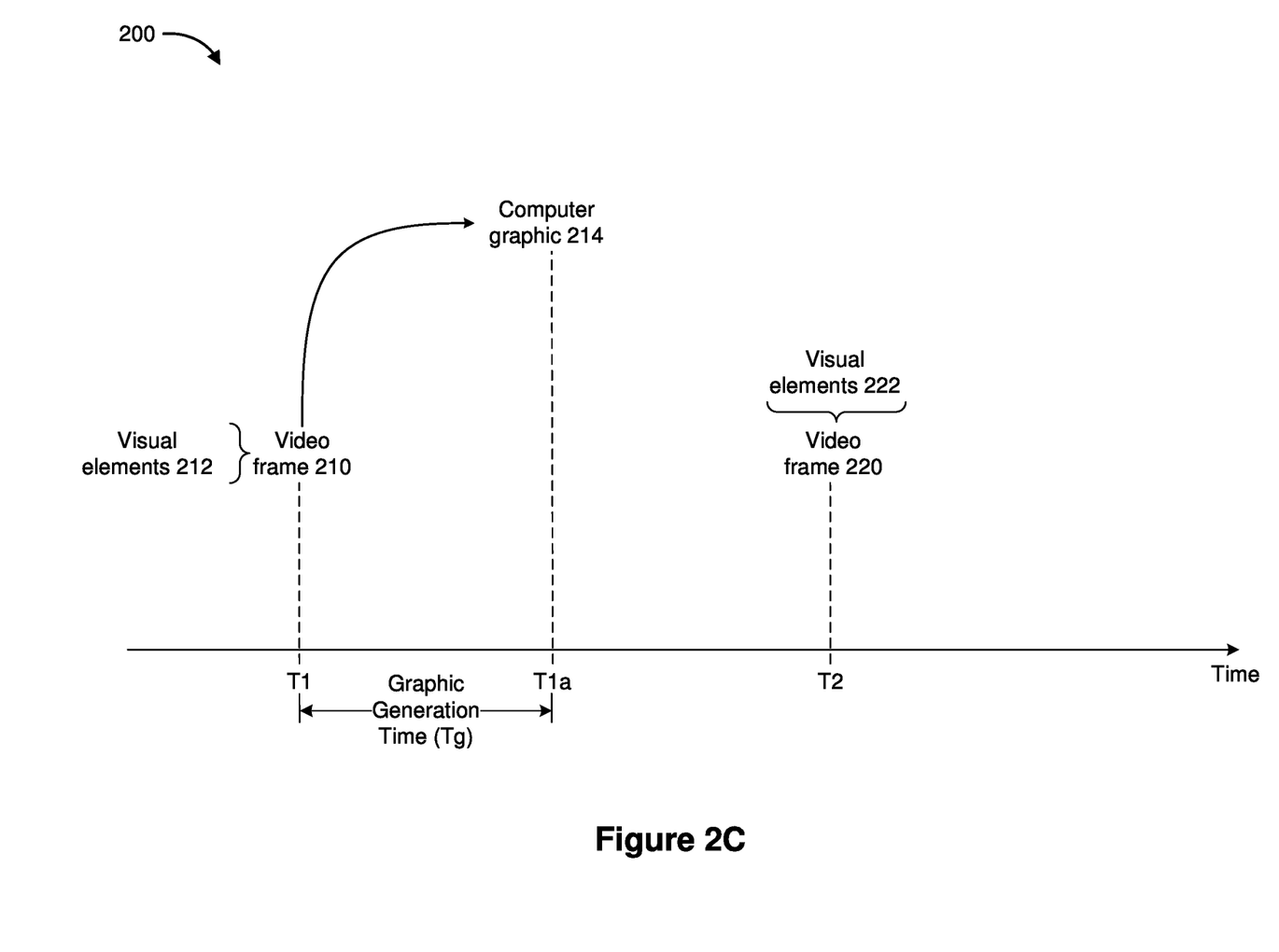

Referring to FIG. 2C, the controller 110 and/or the HMD 120 obtain a second video frame 220 that is associated with a second time T2. In some implementations, a camera (e.g., a front-facing camera of the HMD 120) captures the second video frame 220 at the second time T2. The second time T2 is different from the first time T1. For example, in some implementations, the second time T2 occurs after the first time T1. In some implementations, the second time T2 occurs before the first time T1.

In some implementations, the second video frame 220 is associated with a second set of visual elements 222. In some implementations, the second set of visual elements 222 indicate a second intensity level associated with the second video frame 220. For example, in some implementations, the second set of visual elements 222 indicates a second ambient lighting level of the physical environment 105 when the second video frame 220 was captured. In some implementations, the second set of visual elements 222 includes pixel values for various pixels in the second video frame 220.

Figure 2D:
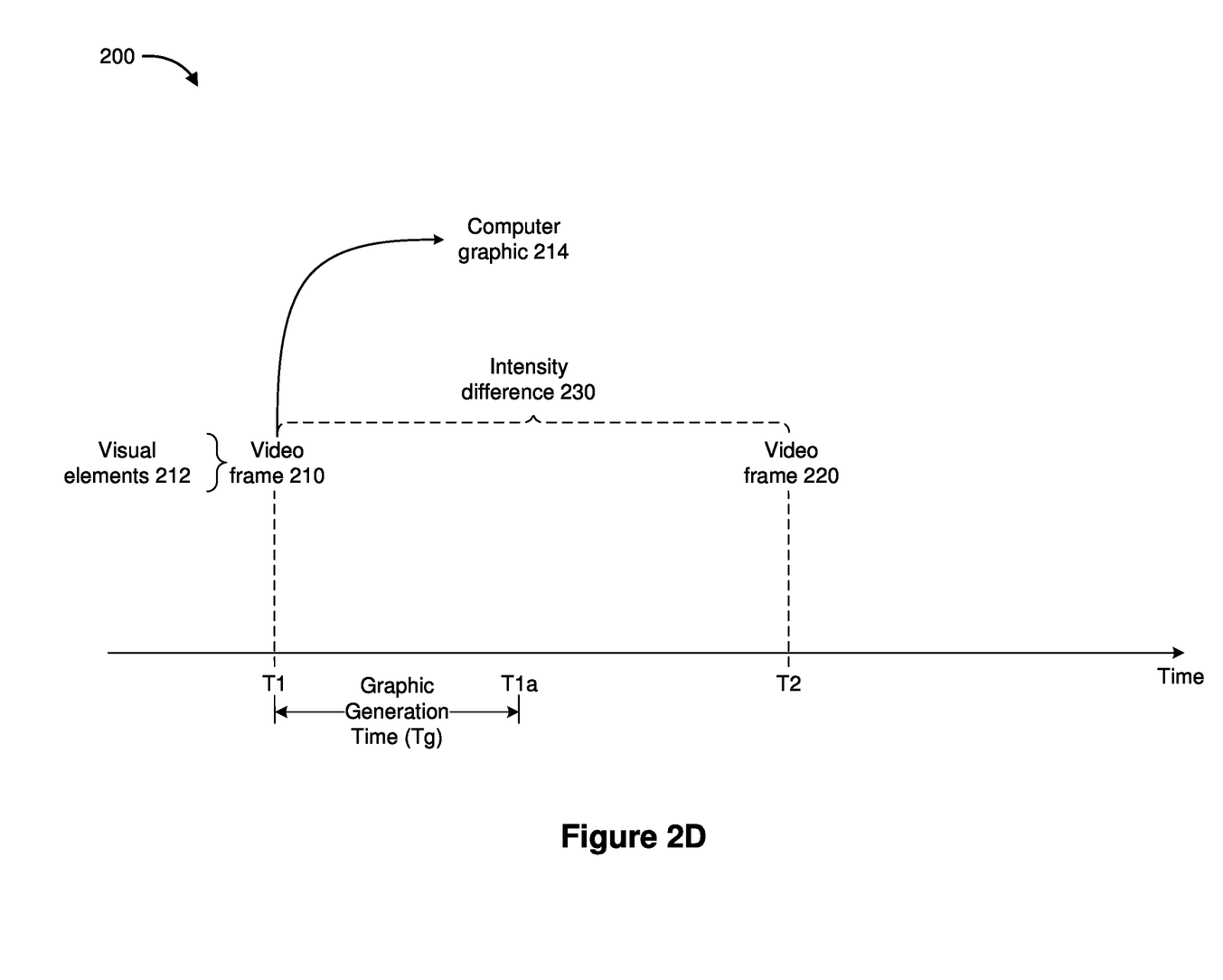

Referring to FIG. 2D, in some implementations, the controller 110 and/or the HMD 120 determine an intensity difference 230 between the first video frame 210 and the second video frame 220. In some implementations, the intensity difference 230 indicates a difference between the first ambient lighting level when the first video frame 210 was captured and the second ambient lighting level when the second video frame 220 was captured.

Figure 2E:
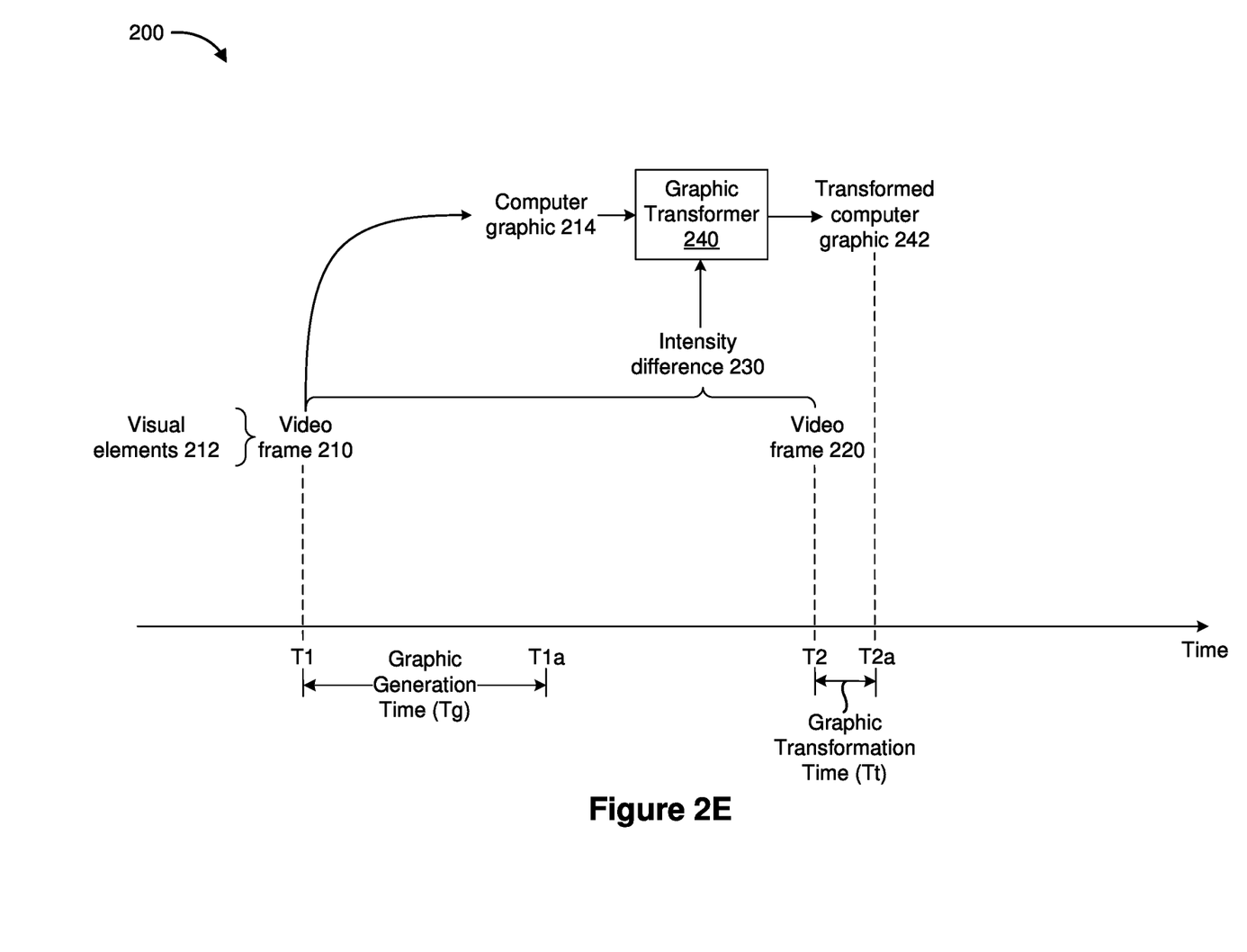

Referring to FIG. 2E, a graphic transformer 240 applies an intensity transformation to the computer graphic 214 in order to generate a transformed computer graphic 242. In some implementations, the intensity transformation is a function of the intensity difference 230 between the first video frame 210 and the second video frame 220. In some implementations, the graphic transformer 240 resides at the controller 110 and/or the HMD 120. In other words, in some implementations, the controller 110 and/or the HMD 120 apply the intensity transformation to the computer graphic 214 in order to generate the transformed computer graphic 242.

In some implementations, the graphic transformer 240 determines whether the computer graphic 214 is suitable for (e.g., matches) the second video frame 220. If the computer graphic 214 is suitable for the second video frame 220, then the computer graphic 214 is rendered with the second video frame 220. However, if the computer graphic 214 is not suitable for the second video frame 220 (e.g., the computer graphic 214 does not match the second video frame 220), then the graphic transformer 240 transforms the computer graphic 214 to generate the transformed computer graphic 242. If the computer graphic 214 is unsuitable for the second video frame 220, then the transformed computer graphic 242 is rendered with the second video frame 242.

In some implementations, the graphic transformer 240 determines that the computer graphic 214 is suitable for (e.g., matches) the second video frame 220 if the intensity difference 230 is less than a threshold. If the intensity difference 230 is less than the threshold, then the graphic transformer 240 does not transform the computer graphic 214 and the second video frame 220 is rendered with the computer graphic 214. In some implementations, the graphic transformer 240 determines that the computer graphic 214 is unsuitable (e.g., does not match) the second video frame 220 if the intensity difference 230 is greater than the threshold. If the intensity difference 230 is greater than the threshold, then the graphic transformer 240 transforms the computer graphic 214 and the second video frame 220 is rendered with the transformed computer graphic 242.

In the example of FIG. 2E, the controller 110 and/or the HMD 120 finish generating the transformed computer graphic 242 at time T2a. Graphic transformation time Tt indicates an amount of time it takes the controller 110 and/or the HMD 120 to apply the intensity transformation to the computer graphic 214 in order to generate the transformed computer graphic 242. As can be seen in FIG. 2E, the graphic transformation time Tt is less than the graphic generation time Tg. As such in various implementations, transforming a previously generated computer graphic is faster than generating a new computer graphic. In some implementations, transforming a previously generated computer graphic utilizes fewer computing resources than generating a new computer graphic.

In various implementations, transforming the computer graphic 214 reduces (e.g., eliminates) the need to generate a new computer graphic for the second video frame 220. In some implementations, the transformed computer graphic 242 is within a degree of similarity to a new computer graphic that would be generated for the second video frame 220. In some implementations, applying the intensity transformation to the computer graphic 214 utilizes fewer resources than generating a new computer graphic for the second video frame 220. For example, applying the intensity transformation to the computer graphic 214 is faster than generating a new computer graphic for the second video frame 220. In some implementations, applying the intensity transformation to the computer graphic 214 is less processor-intensive than generating a new computer graphic for the second video frame 220. For example, applying the intensity transformation to the computer graphic 214 utilizes fewer processor cycles than generating a new computer graphic for the second video frame 220.

In various implementations, applying the intensity transformation to the computer graphic 214 results in a transformed computer graphic 242 that is more suitable for the second video frame 220 than the computer graphic 214. For example, the transformed computer graphic 242 more closely matches the second intensity level of the second video frame 220.

In some implementations, applying the intensity transformation includes applying a scaling factor to the intensities of the computer graphic 214. In some implementations, the scaling factor is a function of (e.g., proportional to) the intensity difference 230. For example, if the intensity difference 230 is −50%, then the graphic transformer 240 applies a scaling factor of 0.5 to the intensities of the computer graphic 214. In other words, if the second intensity level associated with the second video frame 220 is half of the first intensity level associated with the first video frame 210, then the graphic transformer 240 applies a scaling factor of 0.5 to the computer graphic 214. In some implementations, the same scaling factor is applied to all pixels.

In some implementations, the intensity difference 230 indicates intensity differences between corresponding pixels. In such implementations, different scaling factors are applied to different pixels. For example, if the intensity of the top-left pixel increased by 10%, then the graphic transformer 240 applies a scaling factor of 1.10 to a portion of the computer graphic 214 that corresponds to the top-left pixel. However, if the intensity of the bottom-right pixel decreased by 50%, then the graphic transformer 240 applies a scaling factor of 0.5 to a portion of the computer graphic 214 that corresponds to the bottom-right pixel. As such, in some implementations, different transformation factors are applied to different pixels.

In some implementations, a camera capturing the first and second video frames 210 and 220 moves after capturing the first video frame 210. In such implementations, the graphic transformer 240 applies the intensity transformation based on an estimate of the camera motion. In some implementations, the graphic transformer 240 obtains an estimate of the camera motion from visual inertial odometry (VIO) and/or a depth sensor located in the physical environment. In some implementations, the graphic transformer 240 determines the projection of a physical environment point onto corresponding pixels in the first and second video frames 210 and 220 based on the VIO and/or depth data from the depth sensor.

In some implementations, the graphic transformer 240 determines whether to apply the intensity transformation. In some implementations, the graphic transformer 240 determines whether the intensity difference 230 breaches (e.g., exceeds) a threshold. In such implementations, the graphic transformer 240 applies the intensity transformation if the intensity difference 230 breaches the threshold, and the graphic transformer 240 forgoes applying the intensity transformation if the intensity difference 230 satisfies (e.g., does not exceed) the threshold.

In some implementations, generating the computer graphic 214 includes utilizing a virtual light and setting a virtual light level for the virtual light. In some implementations, the virtual light level selected for the computer graphic 214 is a function of the first ambient light level associated with the first video frame 210. In some implementations, the graphic transformer 240 applies the intensity transformation by adjusting the virtual light level of the virtual light based on the intensity difference 230. In some implementations, the graphic transformer 240 adjusts the virtual light level to match the second ambient level associated with the second video frame 220. For example, if the intensity difference 230 indicates that the second ambient level is half of the first ambient level, then the graphic transformer 240 reduces the virtual light level by 50%.

In some implementations, the controller 110 and/or the HMD 120 composites the transformed computer graphic 242 onto the second video frame 220. As such, the second video frame 220 is rendered and displayed according to the transformed computer graphic 242. In some implementations, the controller 110 and/or HMD 120 adjusts pixel values of the second video frame 220 according to the transformed computer graphic 242. In other words, in some implementations, the controller 110 and/or the HMD 120 modifies the second video frame 220 based on the transformed computer graphic 242 (e.g., in order to make the second video frame 220 more suitable for the transformed computer graphic 242).

Figure 3:
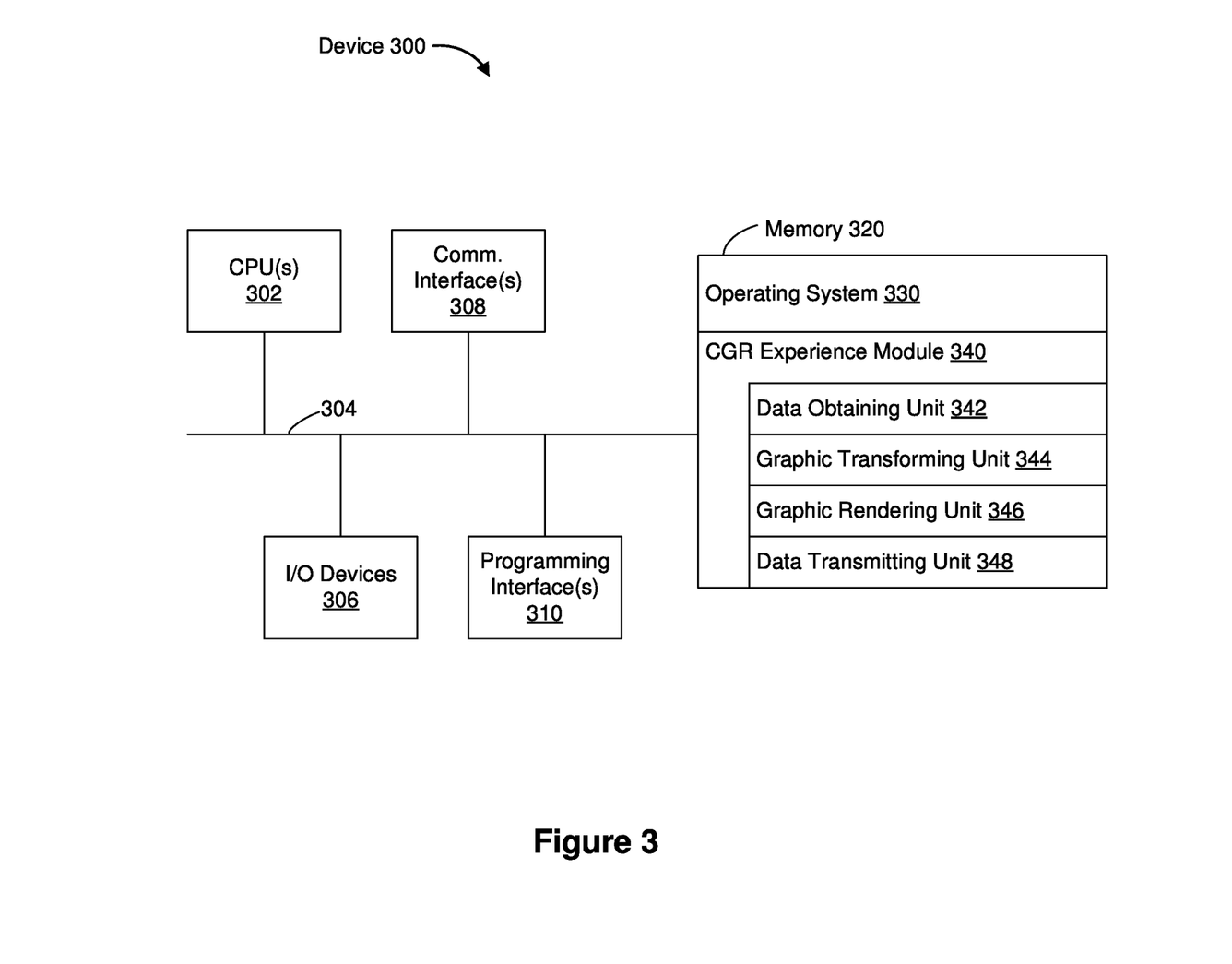
FIG. 3 is a block diagram of an example device in accordance with some implementations.

FIG. 3 is a block diagram of an example device 300 (e.g., the controller 110 and/or the HMD 120 shown in FIG. 1) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 300 includes one or more processing units 302 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 306, one or more communication interfaces 308 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 310, a memory 320, and one or more communication buses 304 for interconnecting these and various other components.

In some implementations, the one or more communication buses 304 include circuitry that interconnects and controls communications between system components. In some implementations, the one or more I/O devices 306 include at least one of a keyboard, a mouse, a touchpad, a joystick, one or more microphones, one or more speakers, one or more image sensors (e.g., one or more cameras, for example, a front-facing camera), one or more displays (e.g., one or more CGR displays), and/or the like.

The memory 320 includes high-speed random-access memory, such as dynamic random-access memory (DRAM), static random-access memory (SRAM), double-data-rate random-access memory (DDR RAM), or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR experience module 340.

The operating system 330 includes procedures for handling various basic system services and for performing hardware dependent tasks. In some implementations, the CGR experience module 340 is configured to manage and coordinate one or more CGR experiences for one or more users (e.g., a single CGR experience for one or more users, or multiple CGR experiences for respective groups of one or more users). To that end, in various implementations, the CGR experience module 340 includes a data obtaining unit 342, a graphic transforming unit 344, a graphic rendering unit 346, and a data transmitting unit 348.

In some implementations, the data obtaining unit 342 is configured to obtain data (e.g., presentation data, interaction data, sensor data, location data, etc.). For example, in some implementations, the data obtaining unit 342 obtains a computer graphic generated based on one or more visual elements within a first video frame. The first video frame is associated with a first time. For example, the data obtaining unit 342 obtains the computer graphic 214 shown in FIGS. 2B-2E. In some implementations, the data obtaining unit 342 receives the computer graphic. In some implementations, the data obtaining unit 342 receives the first video frame, and generates the computer graphic for the first video frame.

In some implementations, the data obtaining unit 342 obtains a second video frame associated with a second time. For example, the data obtaining unit 342 obtains the second video frame 220 shown in FIGS. 2C-2E. In some implementations, the second video frame is captured by a camera of the device 300, and the data obtaining unit 342 receives the second video frame from the camera. The second time is different from the first time. For example, in some implementations, the second time occurs after the first time (e.g., as shown in FIG. 2C, the second time T2 occurs after the first time T1). In some implementations, the second time occurs before the first time.

In some implementations, the graphic transforming unit 344 applies an intensity transformation to the computer graphic in order to generate a transformed computer graphic. For example, the graphic transforming unit 344 applies an intensity transformation to the computer graphic 214 to generate the transformed computer graphic 242 shown in FIG. 2E. In some implementations, the graphic transforming unit 344 determines the intensity transformation based on an intensity difference between the first video frame and the second video frame (e.g., based on the intensity difference 230 shown in FIG. 2E). In some implementations, the graphic transforming unit 344 includes the graphic transformer 240 shown in FIG. 2E.

In some implementations, the graphic transforming unit 344 determines whether to apply the intensity transformation based on an intensity difference between the first video frame and the second video frame (e.g., the intensity difference 230 shown in FIG. 2E). In some implementations, the graphic transforming unit 344 applies the intensity transformation if the intensity difference is greater than a threshold. In some implementations, the graphic transforming unit 344 does not apply the intensity transformation if the intensity difference is less than a threshold. If the intensity difference between the first and second video frames is less than the threshold, the graphic rendering unit 346 renders the second video frame in accordance with the computer graphic that was generated for the first video frame.

In some implementations, the graphic rendering unit 346 renders the transformed computer graphic based on one or more visual elements within the second video frame. For example, the graphic rendering unit 346 renders the transformed computer graphic 242 based on the second set of visual elements 222 with the second video frame 220. In some implementations, the graphic rendering unit 346 composites the transformed computer graphic onto the second video frame. For example, the graphic rendering unit 346 composites the transformed computer graphic 242 onto the second video frame 220.

In some implementations, the data transmitting unit 348 transmits the transformed computer graphic. In some implementations, the data transmitting unit 348 transmits the transformed computer graphic to a display of the device 300. In some implementations, the data transmitting unit 348 transmits the transformed computer graphic to another device that displays the computer graphic based on one or more visual elements within the second video frame.

Although the data obtaining unit 342, the graphic transforming unit 344, the graphic rendering unit 346, and the data transmitting unit 348 are shown as residing on a single device (e.g., the device 300, for example, the controller 110 and/or the HMD 120), it should be understood that in other implementations, any combination of the data obtaining unit 342, the graphic transforming unit 344, the graphic rendering unit 346, and the data transmitting unit 348 may be located in separate computing devices.

Moreover, FIG. 3 is intended more as functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
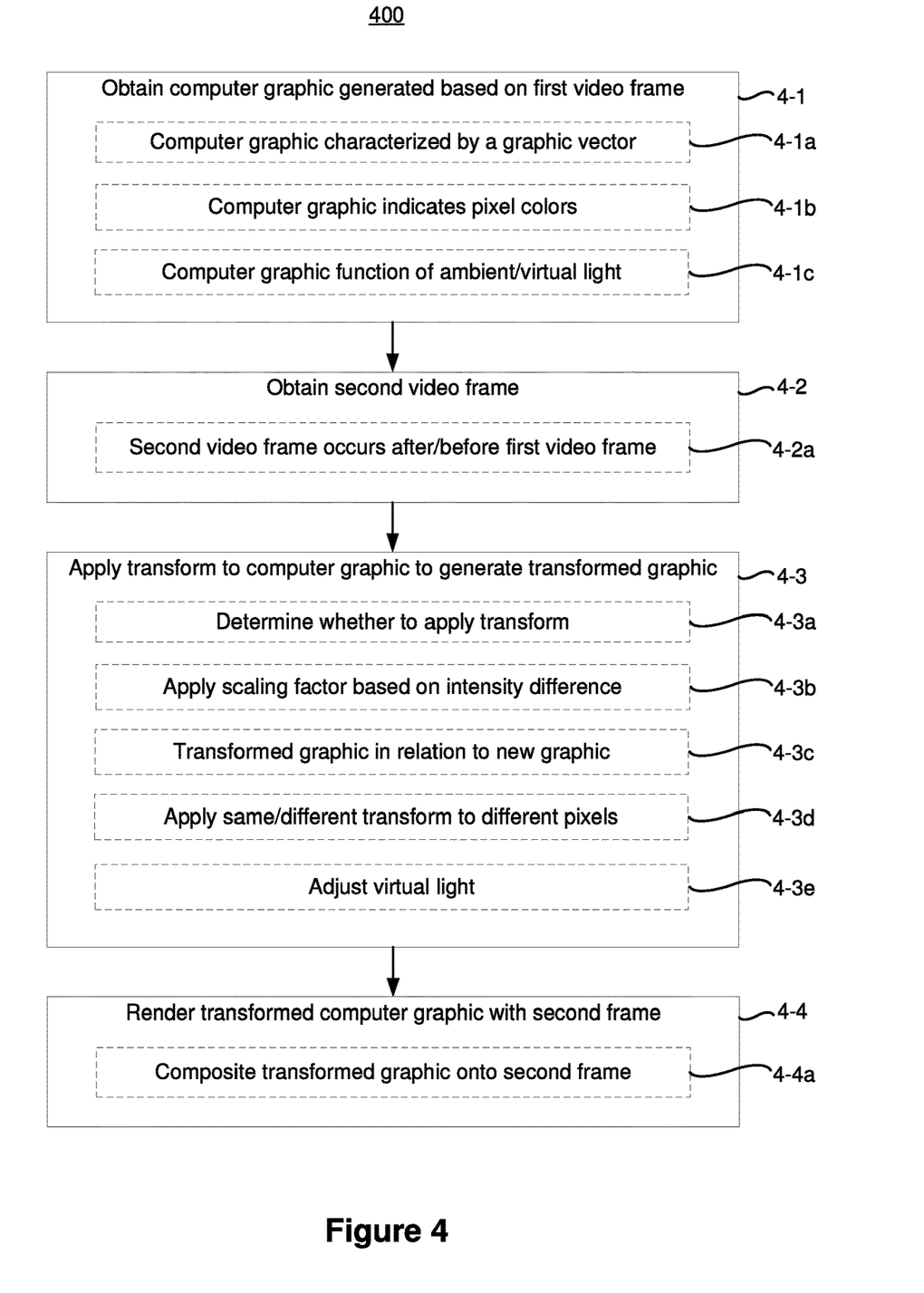
FIG. 4 is a flowchart representation of a method of generating a computer graphic for a CGR experience in accordance with some implementations.

FIG. 4 is a flowchart representation of a method 400 of generating a computer graphic for a CGR experience. In various implementations, the method 400 is performed by a device (e.g., the controller 110 and/or the HMD 120 of FIG. 1). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes obtaining a computer graphic generated based on a first video frame associated with a first time, obtaining a second video frame associated with a second time that is different from the first time, applying an intensity transformation to the computer graphic in order to generate a transformed computer graphic, and rendering the transformed computer graphic with the second video frame.

As represented by block 4-1, in various implementations, the method 400 includes obtaining (e.g., receiving, generating or retrieving) a computer graphic generated based on one or more visual elements within a first video frame. For example, the controller 110 and/or the HMD 120 obtain the computer graphic 214 shown in FIG. 2B. In some implementations, the method 400 includes obtaining (e.g., receiving, capturing or retrieving) the first video frame, and generating the computer graphic based on the first video frame. In some implementations, the method 400 includes receiving the computer graphic from another device that generated the computer graphic. In some implementations, the method 400 includes retrieving the computer graphic from a memory (e.g., the memory 320 shown in FIG. 3). In some implementations, the first video frame is associated with a first ambient light level. For example, the first video frame was captured when the ambient light level was at the first ambient light level.

As represented by block 4-1a, in some implementations, the computer graphic is characterized by vector graphics. In some implementations, the computer graphic is characterized by a graphic vector. As represented by block 4-1b, in some implementations, the computer graphic indicates pixel colors. For example, in some implementations, the computer graphic includes pixel values. As represented by block 4-1c, in some implementations, the computer graphic is a function of a first ambient light level indicated by the first video frame. In some implementations, the computer graphic is generated based on the first ambient light level. For example, in some implementations, the method 400 includes selecting a first virtual light level based on the first ambient light level, and utilizing the first virtual light level to generate the computer graphic.

As represented by block 4-2, in some implementations, the method 400 includes obtaining (e.g., capturing, receiving or retrieving) a second video frame associated with a second time. For example, obtaining the second video frame 220 shown in FIG. 2C. In some implementations, the method 400 includes capturing the second video frame via a camera (e.g., via a front-facing camera of the HMD 120). In some implementations, the method 400 includes receiving the second video frame from another device (e.g., the controller 110 receives the second video frame from the HMD 120). In some implementations, the method 400 includes retrieving the second video frame from a memory (e.g., the memory 320 shown in FIG. 3). In some implementations, the second video frame is associated with a second ambient light level that is different from the first ambient light level. For example, the second video frame was captured when the ambient light level was at the second ambient light level.

As represented by block 4-2a, the second time is different from the first time. For example, in some implementations, the second time occurs after the first time. For example, as shown in FIGS. 2C-2E, the second time T2 occurs after the first time T1. In some implementations, the second time occurs before the first time.

As represented by block 4-3, in some implementations, the method 400 includes applying an intensity transformation to the computer graphic in order to generate a transformed computer graphic. For example, as shown in FIG. 2E, the graphic transformer 240 applies an intensity transformation to the computer graphic 214 in order to generate the transformed computer graphic 242. In some implementations, the intensity transformation is based on an intensity difference between the first video frame and the second video frame. For example, as shown in FIG. 2E, the graphic transformer 240 applies the intensity transformation to the computer graphic 214 based on the intensity difference 230 between the first video frame 210 and the second video frame 220.

As represented by block 4-3a, in some implementations, the method 400 includes, prior to applying the intensity transformation, determining whether to apply the intensity transformation. In some implementations, the method 400 includes applying the intensity transformation in response to determining to apply the intensity transformation. In some implementations, the method 400 includes determining whether an intensity difference between the first video frame and the second video frame breaches (e.g., exceeds) a threshold. If the intensity difference breaches the threshold, then the method 400 includes applying the intensity transformation and utilizing the transformed computer graphic for the second video frame. If the intensity difference does not breach the threshold, then the method 400 includes forgo applying the intensity transformation and utilizing the computer graphic for the first video frame.

As represented by block 4-3b, in some implementations, the method 400 includes applying a scaling factor to the computer graphic based on the intensity difference between the first video frame and the second video frame. In some implementations, the scaling factor is a function of the intensity difference between the first video frame and the second video frame. In some implementations, the scaling factor is a function of (e.g., proportional to) a ratio between the video frames. For example, in some implementations, a first intensity value of a first video frame is 0.5 and a second intensity value of a second video frame is 0.75. In this example, a difference D between the intensities is 0.25. As such, the scaling factor S is set to 1.5, and a constant ratio (D/S) between the first and second video frames is 0.1666 (0.25/1.5).

In some implementations, the method 400 includes applying an affine transform to at least one color channel C (e.g., C'=a*C+b). In some implementations, the method 400 includes setting at least one color channel C to a linear combination of itself and at least one other color channel O (e.g., C'=a*C+b*O+c). In some implementations, the method 400 includes setting at least one color channel C to a non-linear function of itself and at least one other color channel O (e.g., C'=f (C, O)). In some implementations, the color channels are in RGB, sRGB, YUV, YCbCr, HSV, etc.

As represented by block 4-3c, the transformed computer graphic is within a degree of similarity to a new computer graphic generated based on the second video frame. In some implementations, applying the intensity transformation utilizes fewer computing resources than generating a new computer graphic for the second video frame. For example, applying the intensity transformation utilizes fewer processor cycles than generating a new computer graphic for the second video frame. In some implementations, applying the intensity transformation consumes less power than generating a new computer graphic for the second video frame thereby improving the operability of the device. In some implementations, applying the intensity transformation is faster than generating a new computer graphic for the second video frame thereby enhancing user experience and/or improving the operability of the device.

As represented by block 4-3d, in some implementations, the method 400 includes applying a transformation factor (e.g., the same transformation factor, for example, the same scaling factor) to each pixel in the second video frame. In some implementations, the method 400 includes applying different transformation factors (e.g., different scaling factors) to different pixels. For example, in some implementations, the method 400 includes applying a first transformation factor to a first pixel, and applying a second transformation factor to a second pixel. In such implementations, the second transformation factor is different from the first transformation factor.

As represented by block 4-3e, in some implementations, the method 400 includes adjusting a virtual light level associated with the computer graphic to match an ambient light level indicated by the second video frame. In some implementations, the computer graphic for the first video frame utilizes a first virtual light level that is selected based on the first ambient light level associated with the first video frame. In such implementations, the method 400 includes selecting a second virtual light level based on the second ambient light level associated with the second video frame. In such implementations, the method 400 includes adjusting the virtual light level of the computer graphic to the second virtual light level. For example, if the second ambient light level is higher than the first ambient light level then the method 400 includes increasing the virtual light level to match the increased second ambient light level. By contrast, if the second ambient light level is lower than the first ambient light level, then the method 400 includes decreasing the virtual light level to match the decreased second ambient light level.

As represented by block 4-4, in some implementations, the method 400 includes rendering the transformed computer graphic based on one or more visual elements within the second video frame. For example, rendering the transformed computer graphic 242 based on the second set of visual elements 222 within the second video frame 220. As represented by block 4-4a, in some implementations, the method 400 includes compositing the transformed computer graphic onto the second video frame. For example, compositing the transformed computer graphic 242 onto the second video frame 220 shown in FIG. 2E.

In some implementations, the method 400 includes obtaining a first ambient light level when the first video frame is captured, and a second ambient light level when the second video frame is captured. In some implementations, the method 400 includes utilizing an ambient light sensor (ALS) to obtain (e.g., measure) the ambient light levels. In such implementations, the method 400 includes generating the transformed computer graphic based on a difference between the first ambient light level and the second ambient light level. In some implementations, the method 400 includes generating a computer graphic based on the first ambient light level, and transforming the computer graphic to generate a transformed computer graphic based on the second ambient light level. In some implementations, obtaining the ambient light level from an ALS reduces latency thereby improving the performance of the device.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first" "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a non-transitory memory and one or more processors coupled with the non-transitory memory:
obtaining a computer graphic generated based on one or more visual elements within a first video frame, wherein the first video frame is associated with a first time;
obtaining a second video frame associated with a second time, wherein the second time is different from the first time;
in response to an intensity difference between the first video frame and the second video frame being less than a threshold, rendering the second video frame with the computer graphic that was generated based on the first video frame; and
in response to the intensity difference being greater than the threshold:
applying an intensity transformation to the computer graphic in order to generate a transformed computer graphic, wherein the intensity transformation is based on the intensity difference between the first video frame and the second video frame; and
rendering the second video frame with the transformed computer graphic.

2. The method of claim 1, wherein applying the intensity transformation includes applying a scaling factor to the computer graphic based on the intensity difference.

3. The method of claim 2, wherein the scaling factor is a function of the intensity difference.

4. The method of claim 1, further comprising:
prior to applying the intensity transformation, determining whether to apply the intensity transformation; and
applying the intensity transformation in response to determining to apply the intensity transformation.

5. The method of claim 1, wherein the transformed computer graphic is within a degree of similarity to a new computer graphic generated for the second video frame.

6. The method of claim 5, wherein generating the transformed computer graphic utilizes fewer computing resources than generating the new computer graphic for the second video frame.

7. The method of claim 1, wherein applying the intensity transformation includes applying a transformation factor to each pixel in the second video frame.

8. The method of claim 1, wherein applying the intensity transformation includes:

applying a first transformation factor to a first pixel; and applying a second transformation factor to a second pixel, wherein the second transformation factor is different from the first transformation factor.

9. The method of claim 1, wherein the computer graphic is characterized by a graphic vector.

10. The method of claim 1, wherein the computer graphic indicates pixel colors.

11. The method of claim 1, wherein the computer graphic is a function of a first ambient light level indicated by the first video frame.

12. The method of claim 11, wherein the computer graphic is a function of a first virtual light level that is selected based on the first ambient light level.

13. The method of claim 1, wherein applying the intensity transformation includes:

adjusting a virtual light level associated with the computer graphic to match an ambient light level indicated by the second video frame.

14. The method of claim 1, wherein rendering the second video frame with the transformed computer graphic includes:

compositing the transformed computer graphic onto the second video frame.

15. The method of claim 1, wherein the second time occurs after the first time.

16. The method of claim 1, wherein the second time occurs before the first time.

17. A device comprising:
one or more processors;
a non-transitory memory; and
one or more programs stored in the non-transitory memory, which, when executed by the one or more processors, cause the device to:
obtain a computer graphic generated based on one or more visual elements within a first video frame, wherein the first video frame is associated with a first time;
obtain a second video frame associated with a second time, wherein the second time is different from the first time;
in response to an intensity difference between the first video frame and the second video frame being less than a threshold, render the second video frame with the computer graphic that was generated based on the first video frame; and
in response to the intensity difference being greater than the threshold:
apply an intensity transformation to the computer graphic in order to generate a transformed computer graphic, wherein the intensity transformation is based on the intensity difference between the first video frame and the second video frame; and
render the second video frame with the transformed computer graphic.

18. The device of claim 17, wherein applying the intensity transformation includes applying a scaling factor to the computer graphic based on the intensity difference.

19. A non-transitory memory storing one or more programs, which, when executed by one or more processors of a device, cause the device to:
obtain a computer graphic generated based on one or more visual elements within a first video frame, wherein the first video frame is associated with a first time;
obtain a second video frame associated with a second time, wherein the second time is different from the first time;
in response to an intensity difference between the first video frame and the second video frame being less than a threshold, render the second video frame with the computer graphic that was generated based on the first video frame; and
in response to the intensity difference being greater than the threshold:
apply an intensity transformation to the computer graphic in order to generate a transformed computer graphic, wherein the intensity transformation is based on the intensity difference between the first video frame and the second video frame; and
render the second video frame with the transformed computer graphic.

20. The device of claim 18, wherein the scaling factor is a function of the intensity difference.

21. The device of claim 17, wherein the transformed computer graphic is within a degree of similarity to a new computer graphic generated for the second video frame.

22. The non-transitory memory of claim 19, wherein applying the intensity transformation includes applying a scaling factor to the computer graphic based on the intensity difference.

23. The non-transitory of claim 22, wherein the scaling factor is a function of the intensity difference.

24. The non-transitory of claim 19, wherein the transformed computer graphic is within a degree of similarity to a new computer graphic generated for the second video frame.

\* \* \* \* \*